United States Patent [19]

Neefe

[11] Patent Number: 4,564,484
[45] Date of Patent: Jan. 14, 1986

[54] PRODUCTION OF SOFT LENSES HAVING REDUCED SPHERICAL ABERRATIONS

[76] Inventor: Charles W. Neefe, 811 Scurry St., P.O. Box 429, Big Spring, Tex. 79720

[21] Appl. No.: 674,984

[22] Filed: Nov. 26, 1984

[51] Int. Cl.$^4$ .............................................. B29D 11/00
[52] U.S. Cl. ...................................... 264/2.6; 264/2.1; 264/2.7; 351/161
[58] Field of Search ............... 264/2.1, 2.2, 2.7, 1.1, 264/2.3, 1.4, 2.6; 351/160 R, 160 H, 161

[56] References Cited

U.S. PATENT DOCUMENTS

| 4,188,353 | 2/1980 | Neefe | 264/2.7 |
| 4,239,353 | 12/1980 | Koller | 351/160 H |
| 4,307,046 | 12/1981 | Neefe | 264/2.7 |

OTHER PUBLICATIONS

*Naturalens Fitting Manual,* Isen, Griffin Contact Lens Laboratories, Toronto, 1971, pp. 1–16.
"Considerations on Adherence and Centralization of the Hydrogel Contact Lens, *Contacto,* Kikkawa, Mar. 1977, pp. 4–6.

*Primary Examiner*—James Lowe

[57] ABSTRACT

A method of making a contact lens which reduces the spherical aberration of the eye by molding a contact lens blank with a concave aspheric surface having a longer radius of curvature at the center and a shorter radius of curvature toward the edge. A spherical convex surface is cut and polished on the aspheric xerogel lens blank. The xerogel lens is then hydrated to provide a soft hydrogel contact lens having a spherical convex surface and an aspheric concave surface, the lens is placed on the cornea of the eye and the concave lens surface assumes the curvature of the cornea. The convex lens surface becomes aspheric having a longer radius of curvature toward the edge and reduces the physiological spherical aberration of the eye.

2 Claims, 3 Drawing Figures

PRODUCTION OF SOFT LENSES HAVING REDUCED SPHERICAL ABERRATIONS

Aspheric surfaces have many desirable uses in all types of optical lenses. Their extensive uses have been limited by the difficulty in producing them in quantity and economically. The object of the present invention is to provide a reliable and economical method of producing large numbers of quality aspheric surfaces. A sphere is a poor refracting surface due to spherical aberration. Spherical aberration is the inability of all parts of a spherical surface to bring parallel light rays to a point focus. The periphery of a spherical refracting surface has a shorter focal length than the central area. This condition worsens rapidly with the increase of the aperture. Spherical aberration increases by the square of the aperture. This rapid increase limits the effective use of many larger aperture lenses. Coma and astigmatism of oblique incidents are two off axis manifestations of spherical aberration. If the paths of parallel light are traced through many zones of a large aperture spherical surface, each zone will be found to have a different focal length. If these rays are plotted, a geometric figure, the caustic, will result having no point focus. A zone may be found within the caustic where the rays come closest together. This zone is called the circle of least confusion, and will be located nearer the lens than the focus of the central rays.

If the periphery of the convex lens surface is gradually flattened in precisely the correct degree and place, the caustic may be eliminated and a point focus will result. It has been found that a spherical surface may be changed into such a surface if the area near the edge is flattened slightly. The point of greatest departure from a sphere will be located seventy-one percent of the distance from the center to the edge.

The following is from a report entitled; "A Clinical Evaluation of the Merits of the Front Surface Aspheric Contact Lens for Patients Manifesting Residual Astigmatism," Ronald L. Kerns, College of Optometry, University of Houston, Aug. 5, 1971, page 5.

"Based upon the results of our study, it is apparent that the front surface aspheric contact lenses will increase visual acuity in patients manifesting residual astigmatism between 0.50 D and 1.75 D. The amount of increase will depend on the amount of residual astigmatism and the resolving power of the eye but should not depend on pupil size."

Tscherning described the spherical aberration of the eye in detail in his book, "Physiologic Optics," in 1900. Carl Zeiss explored the possibilities of correcting microscope eye pieces for the spherical aberration of the human eye. Zeiss abandoned the project when he discovered the irregularities of curvature present on the corneal surface. In camera and instrument lenses, spherical aberration is corrected by bending the lens form. The least longitudinal spherical aberration occurs in a single element plus lens if the front surface has six times the refractive power of rear surface.

Aspheric front surfaces are used on the higher quality cataract spectacle lenses to correct the aberration present in the spectacle lens only.

The optical system of the eye is unique in that the light enters the refractive media and comes to a focus within the refractive media.

Spherical aberration is the inability of a spherical lens to focus light from the center and periphery to the same point. This condition is corrected by an aspheric convex curve having a longer radius toward the edge.

The present invention describes a unique method of providing an aspheric soft lens to reduce the spherical aberration. Spin cast lenses have a parabolic aspheric concave curve which is produced by the spin cast process.

The shape of the spinning concave liquid surface can be expressed in a coordinate system as:

$$z(r) = \frac{w^2 r^2}{2g} + \frac{o}{pg}\left[\frac{1}{R_s} + \frac{1}{R_t}\right]$$

where,
w is rotational speed,
g is gravitational acceleration,
o is surface tension,
p is liquid density,
$R_s$ is surface sagittal radius of curvature and
$R_t$ is surface tangential radius of curvature.

As can be seen, the peripheral concave area will have a longer radius than the center which translates to a shorter peripheral radius when the lens is in place on the eye. This is contrary to the laws of optics and produces aberrations which increase toward the lens edge. This is an unwanted convex aspheric surface having a shorter radius toward the edge.

The present invention, a method of providing a convex curvature having a longer peripheral convex radius will improve the optical performance of all soft lenses.

The desired convex curve having a progressively longer radius toward the edge is achieved by providing a concave lens surface having a progressively selected shorter concave radius toward the edge. Such a lens when in place on the eye will have a progressively selected longer convex radius toward the edge. This is not correction for an eye defect such as astigmatism, myopia, or hyperopia. Spherical aberration cannot be corrected with eye glasses, only with contact lenses at the corneal surface. The eye is unique in that light enters the dense refractive media at the corneal surface and is brought to a focus within the dense refractive media without again entering air. Aspheric eye glass lenses correct only the spherical aberration of the eye glass lens itself not that of the optical system of the eye. The present invention is a method of improving the optical performance of all soft contact lenses regardless of the refractive state of the eye.

PRIOR ART

U.S. Pat. Nos. 3,641,717 and 3,778,937 disclose the use of convex aspheric surfaces on contact lenses for the enhancement of visual acuity.

STATE OF THE ART

Soft lenses being flexible conform to the shape of the cornea upon which they are placed. The concave surface of the soft lens assumes the curvature of the convex corneal surface. Spin cast lenses have a progressively longer concave radius toward the edge which results in a progressively shorter convex radius toward the edge when in place on the eye. This condition degrades the image quality provided by the lens.

IN THE DRAWINGS

THE LENS IS MADE AS FOLLOWS

Figure 1:
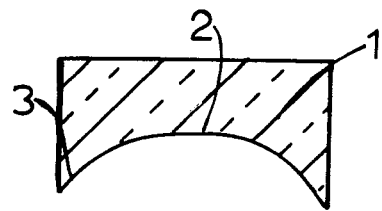
FIG. 1 shows the negative aspheric blank in section.

The aspheric lens blank 1 FIG. 1 with an aspheric concave curvature having a longer radius 2 FIG. 1 near the center and a progressively shorter radius 3 FIG. 1 toward the edge is made by casting. Lens materials such as hydroxyethylmethacrylate (H.E.M.A.), silicone, fluorocarbon copolymers and vinyl pyrrolidone are made by casting.

The casting mold is made from a molding resin such as nylon or polyethylene by injection molding. The aspheric optical surface has a convex radius equal to the required concave blank radius.

The molds optical surface is filled with the selected liquid lens monomer covering the optical surface and allowed to polymerize to form a solid xerogel monolithic mass. Adhesion between the mold and the polymerized lens material must be great enough to insure that separations of the mold and the lens material does not occur during polymerization. The monomer shinks in volume when polymerization occurs and adhesion to the mold is necessary to prevent lens separation from the mold. The monomer shrinkage will be from the top and seen as a lessening of the volume present in the mold. The lens blank is forcibly removed from the mold.

It is possible to cut and polish the aspheric curve having a longer radius 2 FIG. 1 near the center and a shorter radius 3 FIG. 1 near the edge. This is a most difficult operation and requires a high degree of skill and time. Replication is most difficult and impractical in volume production. Molding or casting are much preferred methods.

DEFINING THE ASPHERIC CURVE

The degree or amount of departure from a sphere of the same overall curvature is greatest at a distance seventy-one percent from the center and the amount of departure depends upon the diameter of the lens, the radius of curvature and the refractive index of the lens material. The following formula may be employed to arrive at the maximum depth of the correction required for a plano-convex lens: $x = 0.0123 D/R^3$ x is the departure from a true sphere,
D is the diameter of the lens,
R is the focal - aperture.

The correction at any given distance from the center of the lens may be found by the following formula:
$xy = A/4F^3(N/N-1)(h^2 y^2 - y^4)$ y is the distance from the center of the lens,
A is the aberration coefficient,
h is the radius of the lens,
F is the focal length,
N is the refractive index.

As a simplified method to determine the aspheric corrected contact lens parameters, a computer was programmed to compile the x and y incremental readings to keep the focal point the same for all off-axis rays. At the same time the spherical radius at each increment was calculated.

In conjunction with the above computer calculations, reciprocal or image calculations were generated to make it possible to fabricate the lens by aspherically correcting the lens concave surface.

THE LENS FUNCTIONS AS FOLLOWS

Figure 2:
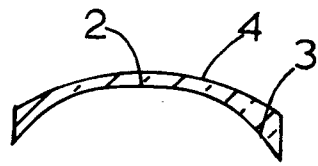
FIG. 2 shows the negative aspheric lens with the aspheric curve on the concave surface in section.
Figure 3:
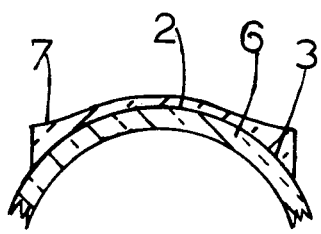
FIG. 3 shows the lens in place on the cornea with the aspheric curve transferred to the convex surface, in section.

A concave negative aspheric curve of the required aspheric curve 2 FIG. 1 is provided by molding or casting. The concave aspheric curve will have a longer central radius 2 FIG. 1 progressively changing to a shorter peripheral radius 3 FIG. 1. A spherical convex curve 4 FIG. 2 is cut and polished on the lens blank in the hard xerogel state to form a xerogel contact lens. The lens is hydrated to form a soft hydrogel lens having a spherical convex surface and a predetermined aspheric concave surface. The lens is placed on a cornea 6 FIG. 3 allowing the concave negative refractive power aspheric surface to conform and assume the shape of the cornea 6 FIG. 3. The convex lens surface will now have the required positive refractive power aspheric curve 7 FIG. 3. The soft lens concave central zone 2 FIG. 3 and peripheral zone 3 FIG. 3 will now have the curvature of cornea 6 FIG. 3. The negative aspheric curve present on the concave soft lens surface is now transferred to the convex surface in positive form. This method is ideally suited to soft lens production as only four molded concave curvatures are required to fit all eye radii. This is due to the lens ability to conform and fit the cornea on which it is placed.

Various modifications can be made without departing from the spirit of this invention or the scope of the appended claims. The constants set forth in the disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of making a contact lens having reduced spherical aberration when in place on the eye made by the steps of providing an aspheric convex optical mold having a longer radius of curvature at the center and a progressively shorter radius of curvature toward the edge of the mold, casting a selected liquid lens monomer over the aspheric convex mold, allowing the liquid lens monomer to polymerize to form a solid xerogel monolithic lens blank, the aspheric lens blank having a concave aspheric surface is removed from the mold, a spherical convex optical surface is cut and polished on the concave aspheric blank to form a xerogel contact lens, the xerogel contact lens is hydrated to form a hydrogel soft contact lens having a spherical convex surface and an aspheric concave surface, the concave lens surface having a shorter radius of curvature toward the lens edge, the soft hydrogel contact lens is placed on the cornea of the eye and the concave lens surface assumes the curvature of the cornea and the convex lens surface becomes an aspheric surface having a longer radius of curvature toward the lens edge and spherical aberration is reduced.

2. A method of making a contact lens having reduced spherical aberration and a progressively longer convex radius of curvature toward the lens edge when in place on the cornea of the eye made by the steps of providing an aspheric convex optical mold having a longer radius of curvature at the center and a predetermined progressively shorter radius of curvature toward the edge of the mold, casting a selected liquid lens monomer over the aspheric convex mold, allowing the liquid lens monomer to polymerize to form a solid xerogel lens blank, the aspheric lens blank having a predetermined concave aspheric surface is removed from the mold, a spherical convex optical surface is cut and polished on the concave aspheric blank to form a xerogel contact lens, the xerogel contact lens is hydrated to form a hydrogel soft contact lens having a spherical convex surface and a selected aspheric concave surface, the aspheric concave lens surface having a progressively shorter radius of curvature toward the lens edge, the soft hydrogel contact lens is placed on the cornea of the eye and the concave lens surface assumes the curvature of the cornea and the convex lens surface becomes an aspheric surface having a progressively longer radius of curvature toward the lens edge and spherical aberration of the eye is reduced.

* * * * *